United States Patent
Stentz et al.

[11] Patent Number: 6,163,636
[45] Date of Patent: Dec. 19, 2000

[54] OPTICAL COMMUNICATION SYSTEM USING MULTIPLE-ORDER RAMAN AMPLIFIERS

[75] Inventors: Andrew John Stentz, Clinton; Kenneth Lee Walker, New Providence, both of N.J.

[73] Assignee: Lucent Technologies Inc., Murray Hill, N.J.

[21] Appl. No.: 09/233,318

[22] Filed: Jan. 19, 1999

[51] Int. Cl.[7] .......................................... H01S 3/30
[52] U.S. Cl. .............................. 385/24; 359/124; 359/334; 359/341; 372/3; 372/6
[58] Field of Search .................................. 385/24; 372/3, 372/6; 359/334, 124, 341, 134

[56] References Cited

U.S. PATENT DOCUMENTS

| | | | |
|---|---|---|---|
| 4,616,898 | 10/1986 | Hicks, Jr. ................................... | 385/24 |
| 5,623,508 | 4/1997 | Grubb et al. ................................. | 372/3 |
| 5,790,300 | 8/1998 | Zediker et al. .......................... | 359/334 |
| 5,832,006 | 11/1998 | Rice et al. ................................... | 372/3 |
| 5,880,877 | 3/1999 | Fermann et al. ......................... | 359/341 |

*Primary Examiner*—Hemang Sanghavi
*Assistant Examiner*—Ellen E. Kim
*Attorney, Agent, or Firm*—Matthews, Collins, Shepherd & Gould, P.A.

[57] ABSTRACT

In accordance with the invention an optical fiber communication system comprising a source of optical signals and an optical fiber transmission line is provided with one or more multiple-order distributed Raman effect amplifiers downstream of the source for amplifying the transmitted signals. As compared with a communication system using conventional first order Raman amplifiers, multiple-order amplifier systems can have reduced noise, longer fiber span lengths and reduced nonlinearities. In a preferred embodiment the system uses signal wavelengths in the range 1530–1570 nm, first order Raman pumping at 1430–1475 nm and second order pumping at about 1345 nm. Advantageously, the second order pump light is copropagating with the signal light and the first order pump is counterpropagating with the signal.

10 Claims, 5 Drawing Sheets

OPTICAL COMMUNICATION SYSTEM USING MULTIPLE-ORDER RAMAN AMPLIFIERS

FIELD OF THE INVENTION

This invention relates to optical communication systems and, in particular, to optical communication systems with amplification provided by multiple-order Raman effect amplifiers.

BACKGROUND OF THE INVENTION

Optical fiber communication systems are beginning to achieve their great potential for the rapid transmission of vast amounts of information. In essence, an optical fiber system comprises a source of information-carrying optical signals, an optical fiber transmission line for carrying the optical signals and a receiver for detecting the optical signals and demodulating the information they carry. The signals are typically within a wavelength range favorable for propagation within silica fibers, and preferably comprise a plurality of wavelength distinct channels within that range.

The optical fibers are thin strands of glass of composition capable of transmitting optical signals over long distances with very low loss. They are small diameter waveguides characterized by a core with a first index of refraction surrounded by a cladding having a second (lower) index. Light rays which impinge upon the core at an angle less than a critical acceptance angle undergo total internal reflection within the fiber core. These rays are guided along the fiber with low attenuation. Typical fibers are made of high purity silica with Germania doping in the core to raise the index of refraction. A transmission line may include many long segments of such fiber separated by intermediate nodes for adding or dropping off signal channels.

Despite significant progress in reducing the attenuation characteristics of optical fibers, signals transmitted through them are attenuated by the cumulative and combined effect of absorption and scattering. Consequently long distance transmission requires periodic amplification.

One approach to optical amplification utilizes Raman effect amplification. In the Raman effect, light traveling within a medium is amplified by the presence of lower wavelength pump light traveling within the same medium. The gain spectrum of a silica fiber pumped by a monochromatic pump was first measured in 1972. The maximum gain occurs when the signal is at a frequency approximately 13 THz lower than the frequency of the pump. The frequency (or wavelength) difference between the pump and the frequency (or wavelength) of maximum gain is often referred to as the Stokes shift, and the amplified signal is referred to as the Stokes wave. Use of a pump that is detuned from the signals by about one Stokes shift (½ the Stoke shift to 3/2 the shift) is referred to as first-order Stokes pumping.

It has also been observed that the gain is significantly larger for a co-polarized signal and pump. This polarization sensitivity can be eliminated if the pump is depolarized, polarization-scrambled on a sufficiently fast time scale or composed of two equally powerful polarized pumps that are polarization multiplexed. See, for example, U.S. Pat. No. 4,805,977, issued to Y. Tamura et al and entitled "Optical Coupler for Optical Direct Amplifier".

Signal amplification utilizing distributed first order Raman effect amplifiers is described in U.S. Pat. No. 4,616,898 issued to John W. Hicks, Jr. on Oct. 14, 1986. The Hicks et al. system disposes a plurality of optical Raman pumps at spaced intervals along the transmission line. These pumps inject into the optical fiber optical pump light at a wavelength shorter than the signal wavelengths by a Stokes shift, so that the presence of the pump light amplifies the lower wavelength signals by the first order Raman effect.

The use of first-order Stokes pumping has several limitations. The power of a strong Raman pump in amplifying a weak signal will always decrease exponentially with of distance as the light propagates into the transmission fiber. This means that regardless of how powerful the pump, most of the amplification occurs relatively near the point where the pump is injected into the fiber (typically within 20 km). This significantly limits the improvement in the signal-to-noise ratio that the Raman pump can induce. As the pump power is increased, Rayleigh scattering of the signal limits the improvement in the signal-to-noise ratio.

In some systems, the distributed Raman amplifiers may be followed by erbium amplifiers. The increased signal power at the input of the erbium amplifier causes the erbium amplifier to have a higher noise figure than it would in the absence of distributed Raman amplification. This effect increases the noise figure of the composite erbium/Raman amplifier and therefore decreases the improvement in the signal-to-noise ratio.

SUMMARY OF THE INVENTION

In accordance with the invention an optical fiber communication system comprising a source of optical signals and an optical fiber transmission line is provided with one or more multiple-order distributed Raman effect amplifiers downstream of the source for amplifying the transmitted signals. As compared with a communication system using conventional first order Raman amplifiers, multiple-order amplifier systems can have reduced noise, longer fiber span lengths and reduced nonlinearities. In a preferred embodiment the system uses signal wavelengths in the range 1530–1570 nm, first order Raman pumping at 1430–1475 nm and second order pumping at about 1345 nm. Advantageously, the second order pump light is copropagating with the signal light and the first order pump is counterpropagating with the signal.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the quantitative graphs, are not to scale.

DETAILED DESCRIPTION

Figure 1:
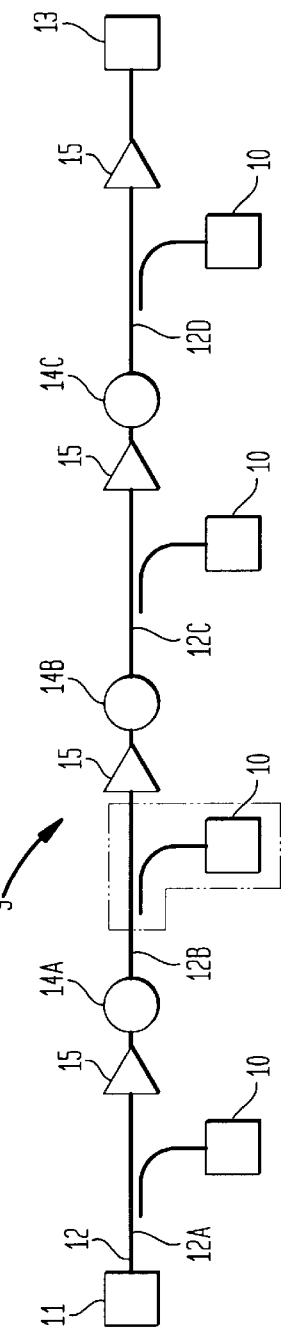
FIG. 1 is a schematic diagram of an optical fiber communication system using multiple order Raman amplifiers.

Referring to the drawings, FIG. 1 schematically illustrates an optical fiber communication system 9 using one or more distributed multiple-order Raman amplifiers 10. The communication system 9 comprises an optical source 11 of information-carrying optical signals and an optical fiber transmission line 12 for carrying the signals to at least one optical receiver 13. The line 12 can comprise a plurality of optical fiber segments 12A, 12B, . . . interconnected at a plurality of nodes 14A, 14B, . . . . Typically signal channels can be added or dropped at the nodes. The Raman amplifiers 10 may optionally be followed by rare earth doped fiber amplifiers 15, such as erbium doped amplifiers.

The source 11 can comprise a modulated laser or light-emitting diode. Preferably it is an array of lasers or diodes for providing a plurality of modulated wavelength distinct optical signals for a wavelength division multiplexed (WDM) optical system. The signals can be modulated as by pulse position modulation or pulse duration modulation.

The transmission line 12 can comprise one or more segments of telecommunications fiber, and the nodes can be any one of a variety of add/drop nodes known in the art for WDM systems. Disposed along line 12 downstream from the signal source are a plurality of multiple-order Raman amplifiers 10 distributed along the length of line 12. The amplifiers 10 are preferably disposed intermediate ends of continuous fiber segments.

Figure 2:
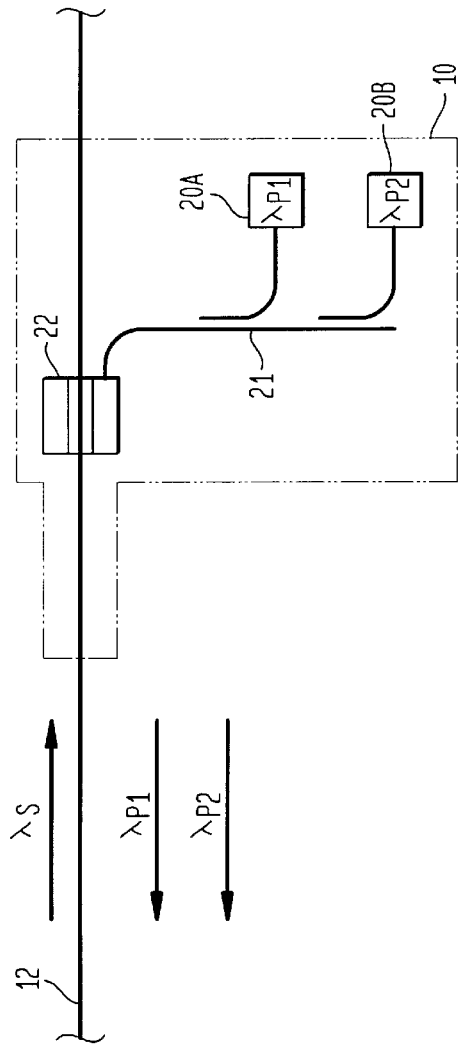
FIG. 2 illustrates a typical multiple order Raman amplifier.

FIG. 2 illustrates a typical multiple order Raman amplifier 10 comprising one or more first order Raman pump sources 20A and one or more second order Raman pump sources 20B. The sources are typically semiconductor lasers and are coupled together, as by a coupler line segment 21. They are coupled into the fiber transmission line 12 as by a wavelength-division-multiplexer 22. Advantageously, the first order pump $\lambda_{p1}$ light is counterpropagated with respect to the communication signal light $\lambda_s$ in line 12 to reduce pump-mediated cross talk. The pump sources 20A and 20B are preferably depolarized, polarization scrambled, or polarization multiplexed to minimize polarization sensitivity of the Raman gain.

The multiple order amplifiers 10 inject both first- and second-order Stokes-shifted pumps into the transmission fiber. A first-order Raman pump light $\lambda_{p1}$ is detuned from the signals by one half to three halves of the Stokes shift, and a second-order pump light $\lambda_{p2}$ detuned from the signals by three halves to five halves of the Stokes shift. The second-order pump amplifies the first-order pump in the transmission fiber, and the first-order pump amplifies the communication signal.

Figure 3A:
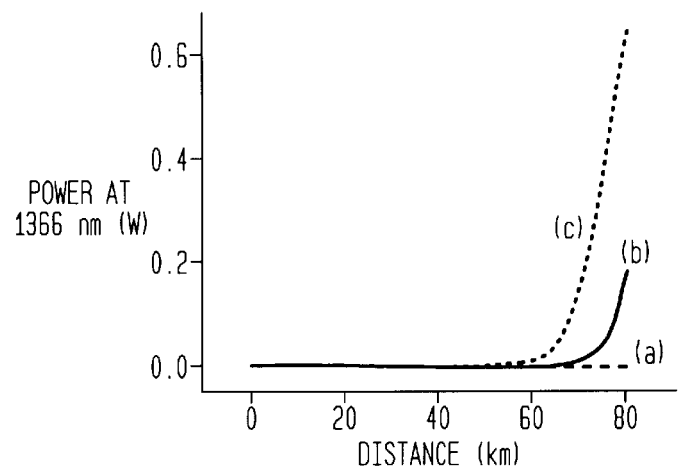
FIGS. 3A, 3B and 3C are graphical illustrations showing the evolution of communication signal power in three different Raman amplification arrangements.
Figure 3B:
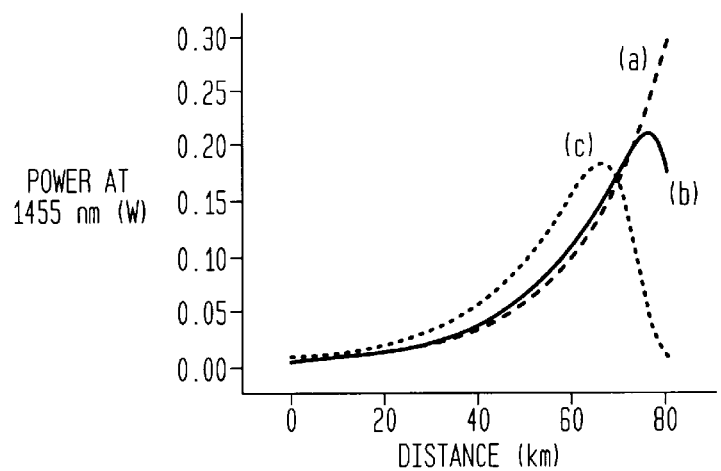
Figure 3C:
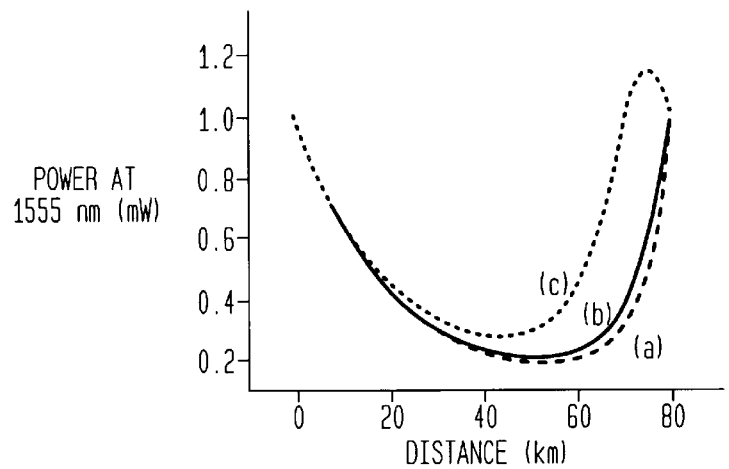

Where, as here, both the first-order and second-order pump powers are injected at the same point, it is advantageous to have lower launched power in the first-order pump than the second-order pump to prevent rapid depletion of the second-order pump. Preferably the first-order pump power is half the second-order pump or less. FIGS. 3A, 3B and 3C show power versus distance for $\lambda_{p2}$=1366 nm, $\lambda_{p1}$=1445 nm and $\lambda_s$=1555 nm, respectively. Each plot shows curves for the following cases: (a) solely a first-order pump, (b) a first- and second-order pump with equal launch powers, and (c) a first-order pump with 10 mW of power and the rest of the power in the second-order pump. Note that the first-order pump reaches its maximum power at a significant distance (comparable to the Beers length) within the transmission fiber.

The invention can now be better understood by consideration of the following specific example:

EXAMPLE 1

In an optical fiber communication system, the first-order pump has wavelengths ranging from 1430–1475 nm and is generated by sets of polarization multiplexed diodes. The total power in this wavelength range is less than 100 mW. The second-order pump is at approximately 1345 nm with an output power of 400 mW. The first- and second-order pumps are wavelength-division-multiplexed and injected into the transmission fiber in the direction opposite of the direction of propagation of the signals. Signal wavelengths fall within the range of 1530–1570 nm. The transmission fiber is composed of 80 km of nonzero-dispersion-shifted fiber with an effective area of approximately 55 square microns.

Figure 4A:
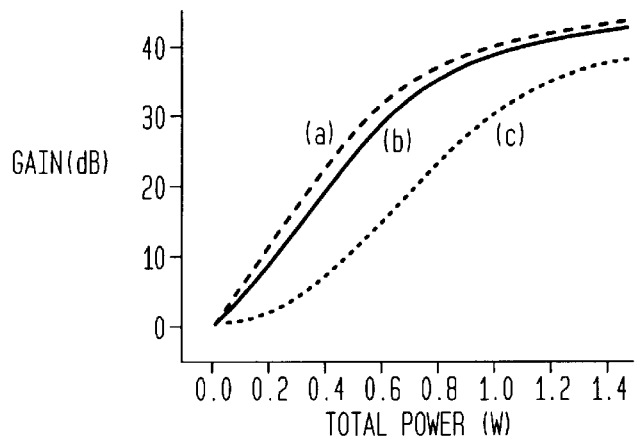
FIGS. 4A, 4B and 4C are graphical illustrations showing the equivalent gain and equivalent noise figures for the three different arrangements plotted in FIG. 3.
Figure 4B:
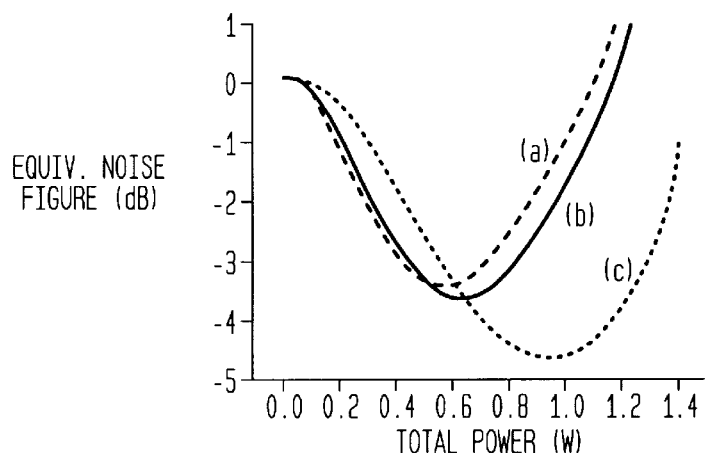
Figure 4C:
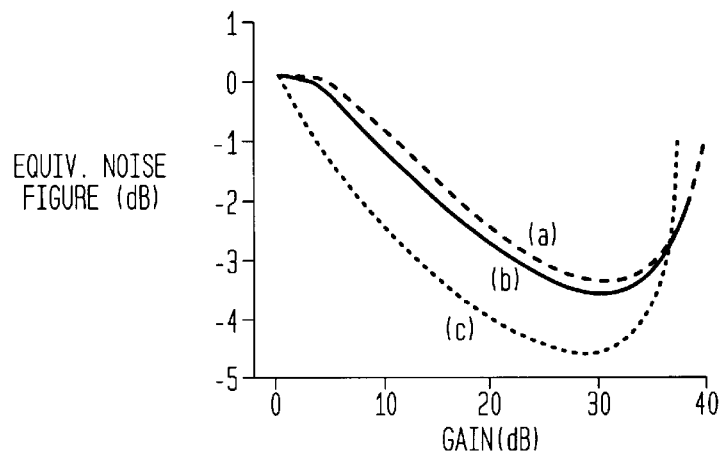

By pushing the gain experienced by the signal wavelengths further into the transmission, the equivalent noise figure generated by a second-order Raman pump can be lower than that of a first-order Raman pump. This effect is demonstrated in FIGS. 4A, 4B and 4C. FIG. 4A is a plot of gain versus total power for the following cases: (a) solely first order pump, (b) first and second order pump with equal launch powers and (c) a first order pump with 10 mW of power and the rest of the power in the second order pump. FIGS. 4B is a plot of the equivalent noise figure versus total power for the same cases, and FIG. 4C plots noise figure versus gain. For equivalent gain, the case of second-order pumping always yields a lower equivalent noise figure, and for pump powers where the equivalent noise figures are equal, the equivalent gain for the case of second-order pumping is lower. Under these conditions, the signal powers reaching the input of an erbium amplifier are lower with second-order Raman pumping than with first-order Raman pumping, causing a smaller increase in the noise figure of the erbium amplifier by the addition of distributed Raman amplification.

Figure 5:
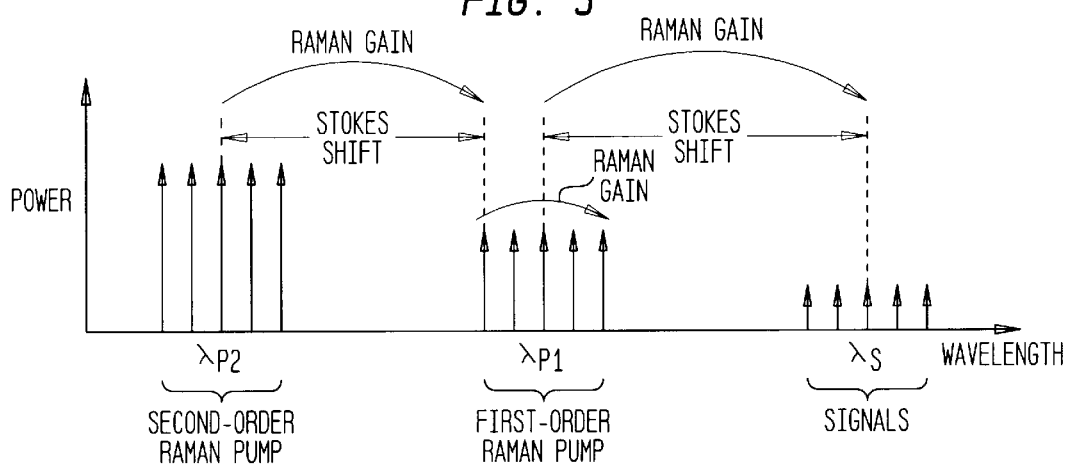
FIG. 5 is a qualitative spectral diagram showing how the center wavelength of the second-order Raman pump can be shifted to compensate gain tilt.
Figure 6:
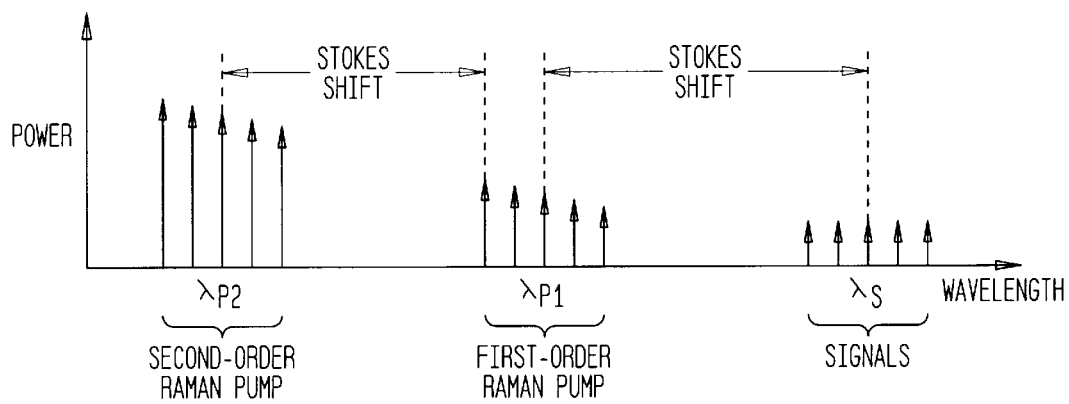
FIG. 6 is a qualitative diagram showing how the spectral distribution of power can be shaped to flatten signal gain.

By selecting the center wavelength of the second-order Raman pump to be greater than one Stokes shift from the center wavelength of the first-order Raman pump, the second-order pump can be used to help compensate for the gain tilt induced when the shorter wavelengths amplify the longer wavelengths of the first-order pump. This effect is illustrated in FIG. 5. The wavelength distribution of power within each of the pumps may be shaped in order to generate a broad and flat signal gain as illustrated in FIG. 6.

Figure 7:
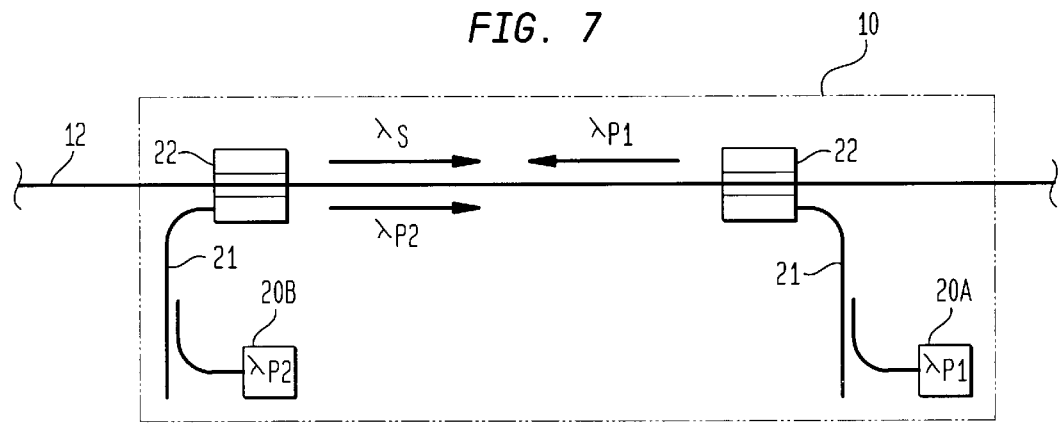
FIG. 7 illustrates an alternative embodiment of a multiple order Raman amplifier.

FIG. 7 illustrates an alternative multiple order Raman amplifying arrangement wherein the first and second order pump sources 20A and 20B are spaced apart along the length of line 12 and the pumps are counterpropagated along line 12. Here light from the first order Raman pump source 20A is injected into line 12 in the direction counterpropagating to the communication signals, and light from the second order Raman pump source 20B is injected in the direction co-propagating with the signals.

The advantage of the FIG. 7 arrangement is that the signals experience little Raman gain from the co-propagating second-order Raman pump due to the large frequency difference between the signals and the second-order pump. Therefore little noise from the second-order pump is transferred to the signals. Nonetheless, the counterpropagating first order pump does experience substantial amplification from the second-order pump in the beginning of the transmission span. Using this geometry, significant Raman gain for the signals can be achieved throughout the transmission span, thereby minimizing power excursions of the signals. By minimizing the power excursions of the signal, the system impairments due to optical nonlinearities are reduced. To minimize the transfer noise from the second order pump to the communication signals, the frequency shift between the center frequency of the signals and the center frequency of the second-order pump should fall in the range from 26 to 32 THz.

This embodiment may be better understood by consideration of the following specific example.

EXAMPLE 2

In a communication system, the first-order pump has wavelengths ranging from 1430–1475 nm generated by sets of polarization-multiplexed diodes. The total power in this wavelength range is approximately 300 mW. The second-order pump at approximately 1345 nm with an output power of 400 mW. The first-order pump is injected into the transmission fiber in a direction counter-propagating to the signal. The second-order pump is injected into the transmission fiber in a direction co-propagating with the signal. Signal wavelengths fall within the range of 1530–1570 nm. The transmission fiber is composed of 40 km of non-zero dispersion-shifted with an effective area of approximately 55 square microns.

Figure 8:
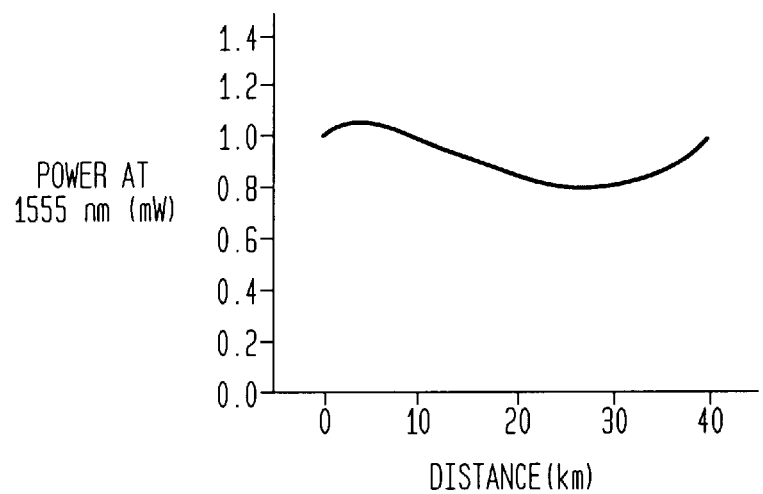
FIG. 8 is a graphical illustration showing the evolution of communication signal power in a system using the amplifier of FIG. 7.

FIG. 8 is a graphical illustration showing the evolution of communication signal power in the system of Example 2.

Figure 9:
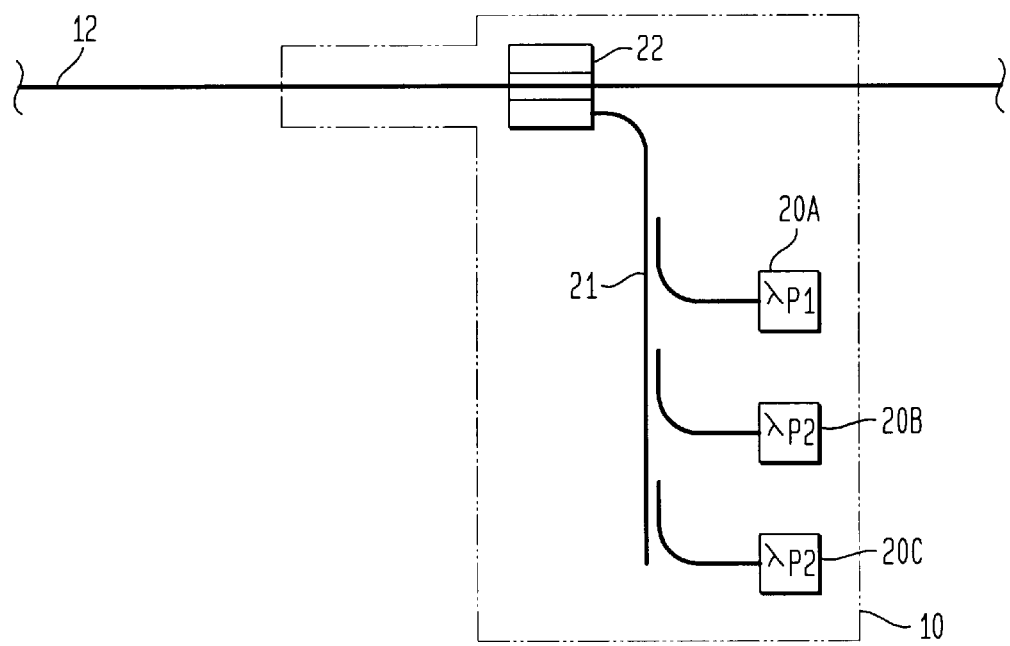
FIG. 9 shows an alternative Raman amplifier.

FIG. 9 shows another alternative embodiment wherein the use of multiple-order Raman pumps is taken one step further by injecting first-, second- and third-order pumps (20A, 20B and 20C, respectively) into the transmission fiber. If the first-and second-order pumps are less powerful than the third-order pump, the position of the peak Raman gain experienced by the signal is pushed further into the transmission system, further improving the signal-to-noise figure. In a typical communications system with signals near 1550 nm, the center wavelengths of the first, second-and third order pumps are approximately $\lambda_{p1}$=1450, $\lambda_{p2}$=1360 and $\lambda_3$=1290 nm. Advantageously, if the pump near 1450 nm has a large bandwidth, the amplification of the long wavelength spectrum near 1450 nm by the short wavelength spectrum near 1450 nm could be compensated by shifting the second- and third-order Stokes pumps to shorter wavelengths. For instance, the first, second-and third-order pumps can be 1430–1475 nm, 1345 nm and 1270 nm. The application of even higher order Raman pumping is possible but limited by the increased loss of standard transmission fiber at shorter wavelengths.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In an optical fiber communication system comprising a source of information-carrying optical signals, an optical fiber transmission line for carrying the optical signals, an amplifier for amplifying the optical signals, and a receiver for detecting and demodulating the optical signals, the improvement wherein said amplifier comprises a multiple order Raman effect amplifier comprising a first pump source for launching into the optical fiber transmission line first order Raman pump light at wavelength for amplifying the optical signals by the first order Raman effect and a second pump source for launching into the optical fiber transmission line second order Raman pump light at wavelength for amplifying the first order pump light.

2. The improved communication system of claim 1 wherein said amplifier comprises a plurality of multiple order Raman effect amplifiers distributed along said optical fiber transmission line.

3. The improved communication system of claim 1 wherein the first order pump light is counterpropagated in said transmission line with respect to the optical signals.

4. The improved communication system of claim 3 wherein the first-order pump light is at a power equal to or less than one-half the power of the second pump light.

5. The improved communication system of claim 1 wherein the second order pump light is counterpropagated in said transmission line with respect to the first order pump light.

6. The improved communication system of claim 1 wherein the first order pump light is detuned from the optical signals by one-half to three halves of the Stokes shift and the second order pump light is detuned from the signals by three halves to five halves of the Stokes shift.

7. The improved communication system of claim 1 wherein the center wavelength of the second order pump is more than one Stokes shift from the center wavelength of the first order Raman pump.

8. The improved communication system of claim 1 further comprising an erbium-doped fiber amplifier following the multiple order Raman effect amplifier in the transmission line.

9. The improved communication system of claim 1 further comprising a third pump source for launching into the transmission line third order Raman pump light for amplifying the second order pump light.

10. The improved communication system of claim 1 wherein the optical signals have a center frequency, the second order pump has a center frequency, and the frequency shift between the center frequency of the signals and the center frequency of the second order pump is in the range from 26 to 32 THz.

* * * * *